April 13, 1965  R. BECKADOLPH ET AL  3,178,327
METHOD OF AND MACHINE FOR MAKING CARCASSES FOR VEHICLE TIRES
Filed Dec. 24, 1962  11 Sheets-Sheet 1
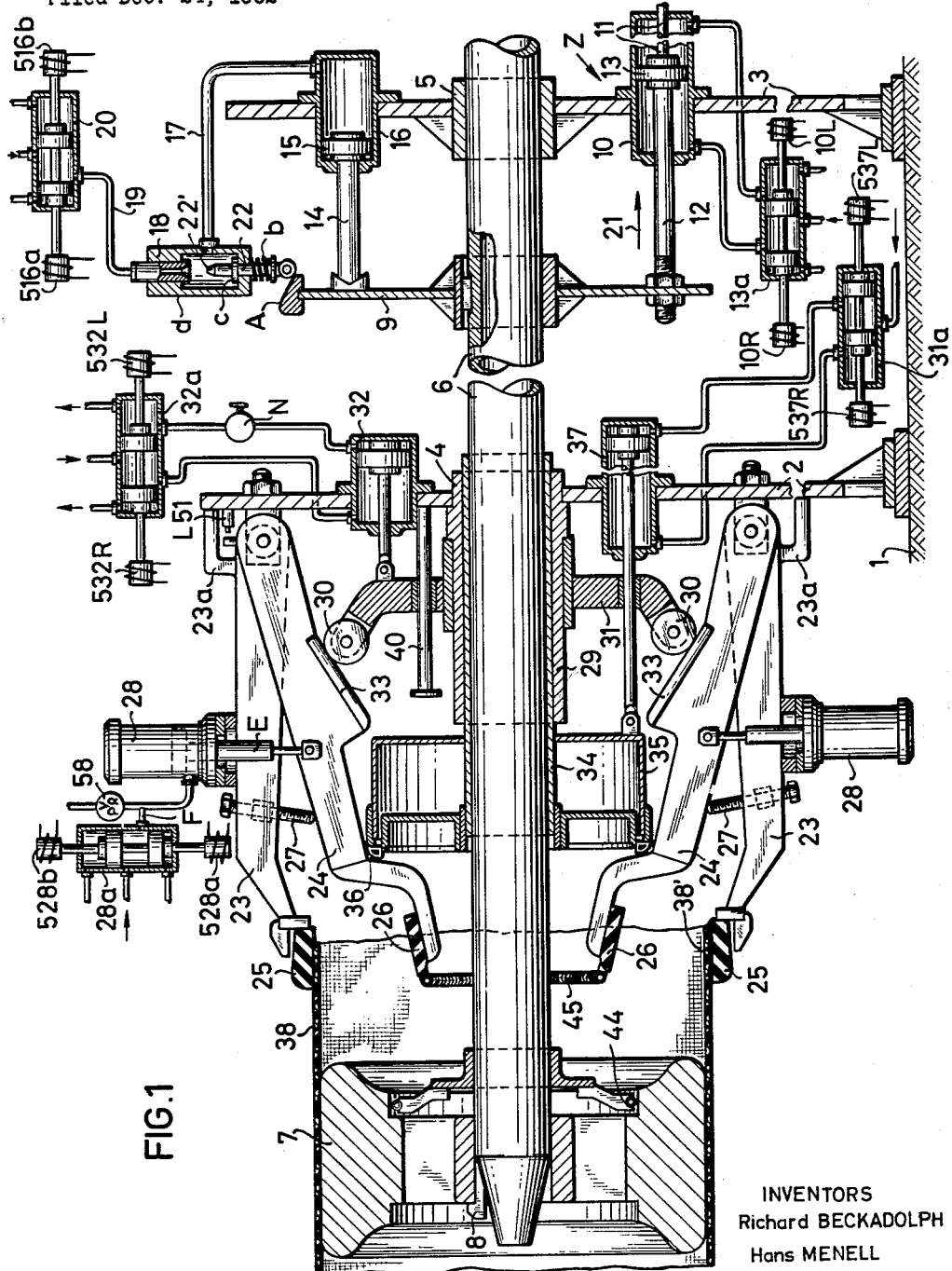
FIG.1
INVENTORS
Richard BECKADOLPH
Hans MENELL
Walter NICLAS

INVENTORS
Richard BECKADOLPH
Hans MENELL
Walter NICLAS

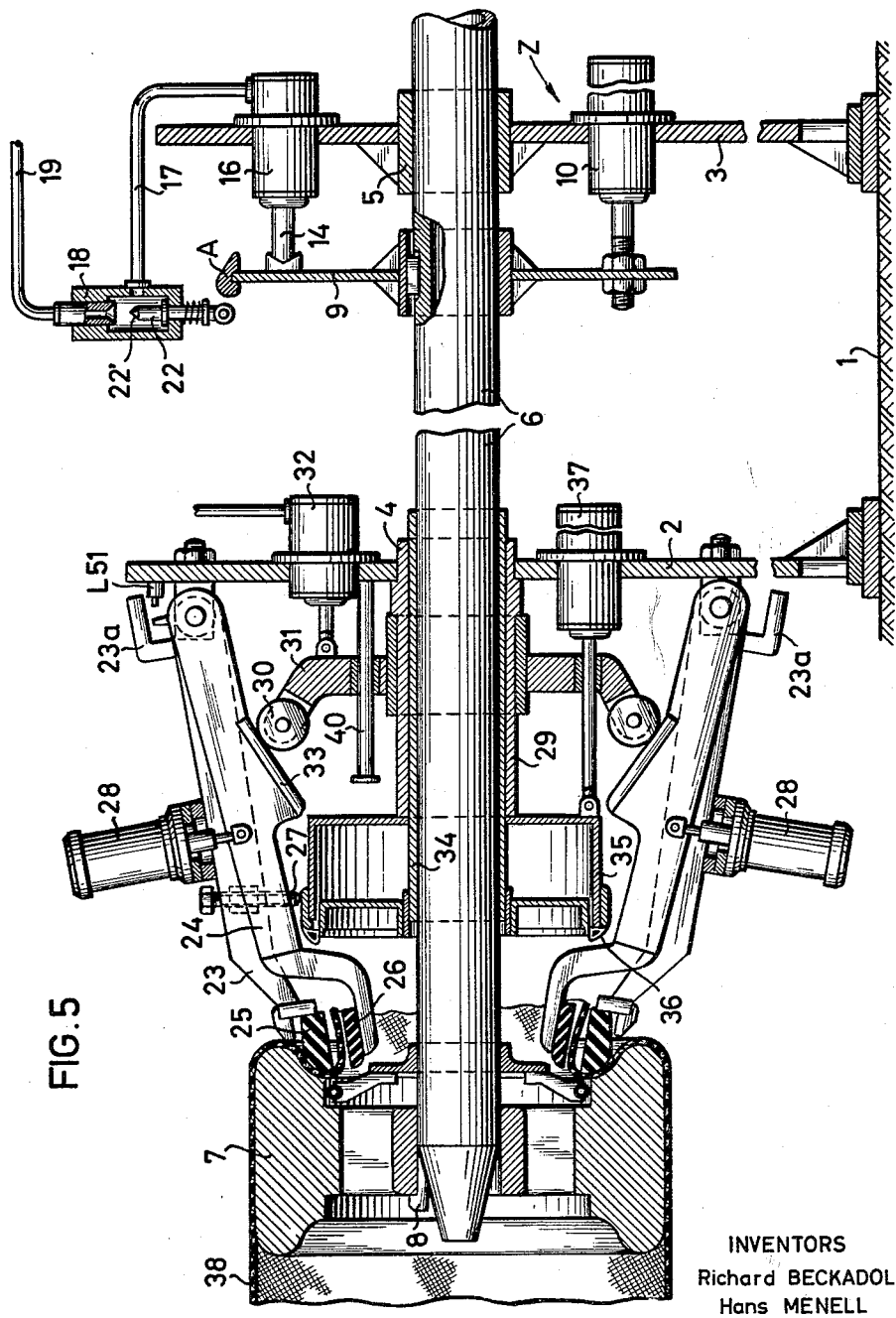

INVENTORS
Richard BECKADOLPH
Hans MENELL
Walter NICLAS

INVENTORS
Richard BECKADOLPH
Hans MENELL
Walter NICLAS

United States Patent Office 3,178,327
Patented Apr. 13, 1965

3,178,327
METHOD OF AND MACHINE FOR MAKING
CARCASSES FOR VEHICLE TIRES
Richard Beckadolph, Hannover, Hans Menell, Ahlem, Hannover, and Walter Niclas, Altwarmbuchen, Germany, assignors to Continental Gummi-Werke Aktiengesellschaft, Hannover, Germany
Filed Dec. 24, 1962, Ser. No. 246,796
Claims priority, application Germany, Nov. 2, 1957, C 15,731
11 Claims. (Cl. 156—133)

This application is a continuation-in-part of our copending application Serial No. 771,433, filed November 3, 1958, now U.S. Patent 3,081,814.

The present invention relates to an apparatus for and a method of making carcasses for pneumatic tires, which apparatus is provided with a supporting stud or shaft carrying the drum for receiving the fabric layers forming the carcass. The invention further relates to a method of operating such apparatus or machine. Such apparatus comprises gripper elements movable radially with regard to said drum and adapted to grasp the marginal portions of the fabric layers and, while subjecting the same to tension, to fold said layers against the drum. This invention also relates to a control system for a machine of the nature described.

With heretofore known machines of this type, control cams are required in order to be able to fold the fabric layers under tension without creases. However, this can be accomplished properly only if the control cam is designed with great care and expense in conformity with the contour of the drum, and if the gripper elements are adapted to carry out corresponding radial movements in the direction toward the supporting stud of the drum, and, if necessary, also movements in opposite direction.

It is an object of the present invention to provide a machine for and method of making carcasses for pneumatic tires, which will considerably simplify heretofore known machines and methods of the type involved and which, in particular, will avoid the drawbacks referred to above relative to the control cam.

It is also an object of the present invention to provide an improved machine for and method of making carcasses for penumatic tires, which will permit folding the fabric layers free from creases without the necessity of providing special control elements for controlling the gripper elements grasping the fabric layers.

Still another object is the provision of a control system for the machine whereby it can be operated substantially automatically.

These and other objects and advantages of the invention will appear more clearly from the following specification in connection with the accompanying drawings, in which:

FIGURE 1 represents a longitudinal section through a machine according to the invention for making carcasses for giant pneumatic tires while employing a high shoulder drum;

FIGURES 2 through 12 show the machine according to FIGURE 1 in various operative working positions;

General arrangement

Figure 2:
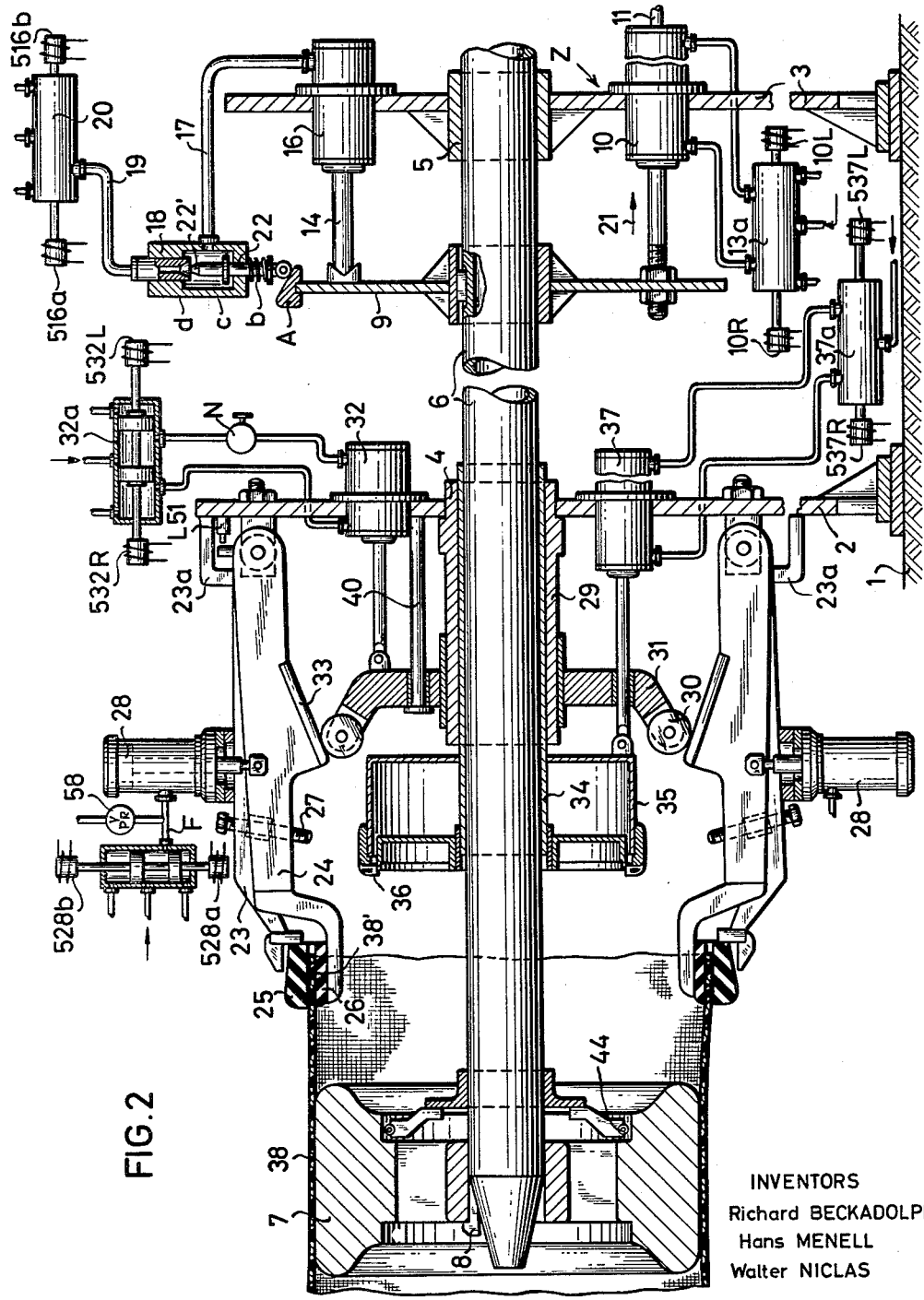

The carcass making machine according to the present invention is characterized primarily in that the folding of the fabric layers against the drum is effected by an axial movement of the drum in the direction toward the gripper elements which is accompanied by a simultaneous movement of the gripper elements in the direction toward the supporting shaft of the drum while the holding force of the gripper elements during the said movement is reduced to permit the fabric to slip therein. The reduction in the holding force of the gripper elements may be effected, for example, by an opening movement of the gripper elements.

According to the present invention, it is of importance that the axial spacing between the drum and the gripper elements, when occupying their starting position, be so great that the gripper elements will grasp portions of the fabric on the drum which, after the folding operation has been completed, will rest against the drum.

When in starting position, the grippers or gripper elements grasp the marginal portions of the fabric layers on the drum so as to grip sections of the fabric layers which later will directly contact the outer surface of the drum.

If the grippers are now moved radially inwardly and simultaneously, the drum is moved in the direction toward the grippers, the fabric layers will be folded against the drum while the aforementioned marginal portions are firmly grasped by the grippers.

A change in speed of the drum and/or of the grippers, or a reversal of the direction of movement of one or both thereof as is normally required near the end of the folding operation according to prior devices, is not required according to the present invention, inasmuch as a reduction in the holding force of the grippers is effected, which will allow the fabric layers to slide or slip in the grippers, while the grippers and the drum will continue their described movements up to the completion of the fabric folding operation.

Structural arrangement

Referring now to the drawings in detail, the arrangement shown therein comprises two stands 2 and 3 connected to a foundation 1. Two bearings 4 and 5 in the stands 2 and 3, slidably support a shaft 6 adapted for receiving and supporting a tire drum 7 designed as a high shoulder drum. Drum 7 is detachably mounted on supporting shaft 6 and is held in its respective position by a key-like hook 8 when the machine is in operation.

Figure 8:
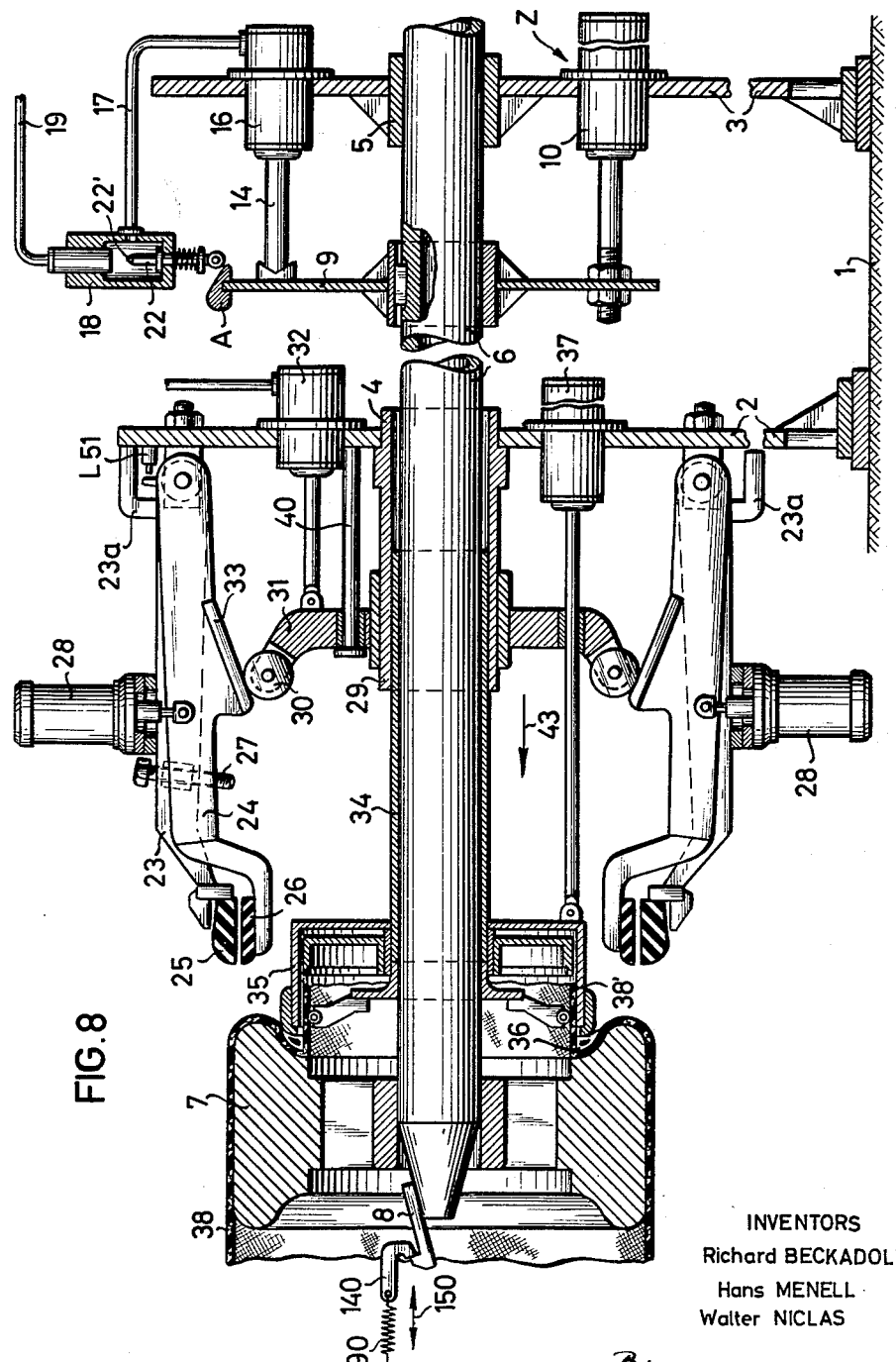
Figure 12:
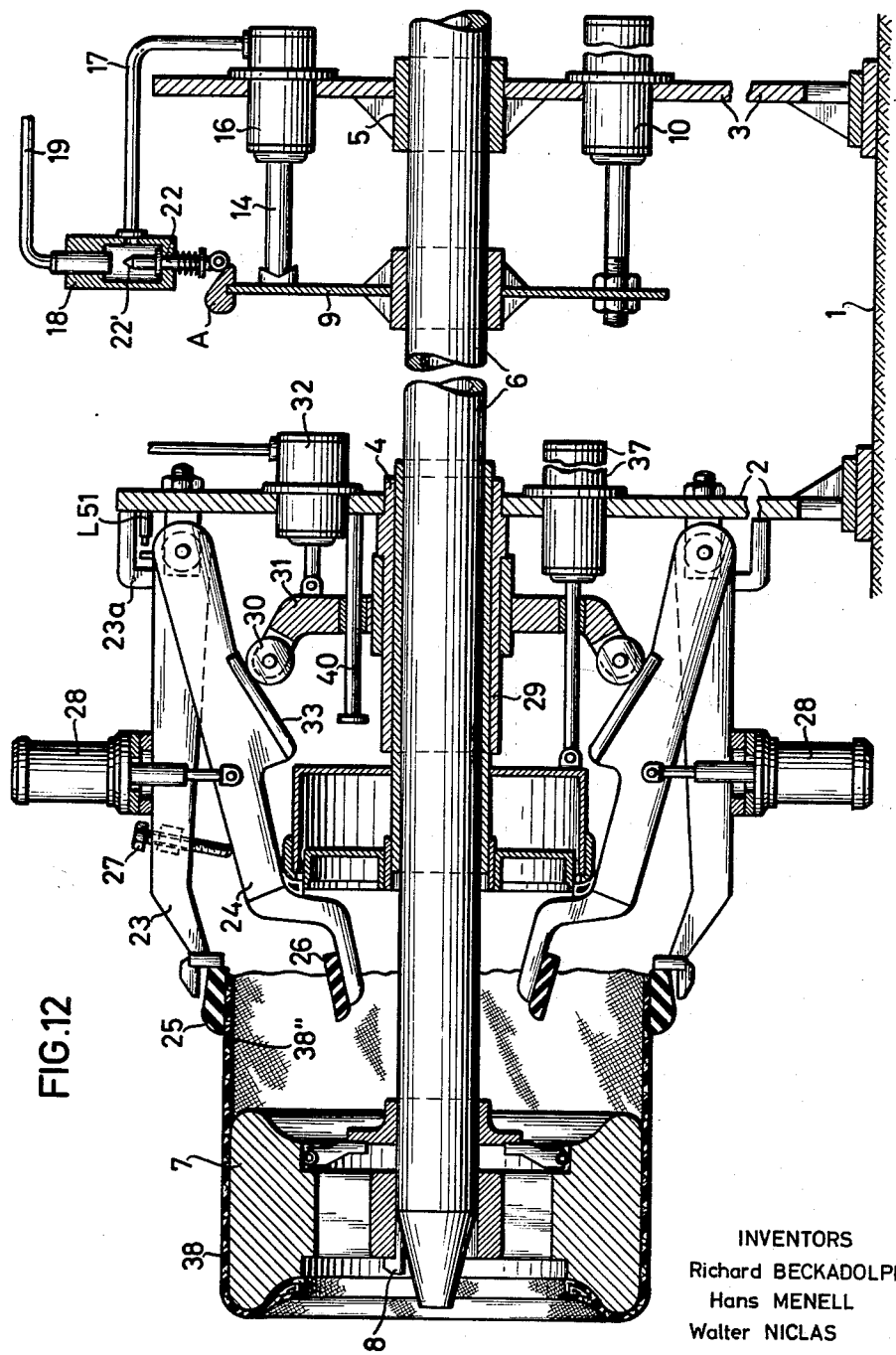

While the above mentioned key-like hook 8 does not form a part of the present invention, it may be briefly stated that this hook may be pulled into a longitudinal groove in mandrel 6 as shown in FIGURE 12, or it may be moved by axial displacement thereof onto the cone of mandrel 6 as shown in FIG. 8. The movement of hook 8 may be effected by means of a rod 140 (see FIG. 8) through the intervention of a flexible spring 90 in the direction of the double arrow 150.

The rear end of shaft 6 has fixedly connected thereto a stiff disc 9. This disc is adapted to be actuated by a hydraulic cylinder piston system generally designated Z which makes possible axial displacement of shaft 6 and thereby an axial movement of drum 7. Cylinder 10 of cylinder piston Z will be seen to comprise a double acting piston 13 with piston rods 11 and 12 of different diameters, respectively, so that selectively the chamber in front or behind piston 13, or if desired, both chambers may be supplied with pressure fluid to produce different forces or working speeds. Valve 13a is connected to cylinder 10, as shown, and when shifted by energization of solenoid 10L, piston 13 moves to the left while energization of solenoid 10R will cause piston 13 to move to the right.

Stand 3 (FIG. 1) has connected thereto a movable abutment 14 for disc 9 which is provided with a piston 15. Piston 15 is slidably mounted in a cylinder 16 stationarily mounted on stand 3.

A valve 20 is connected to conduit 17 which includes variable choke valve 18. This conduit 17 is connected to cylinder 16. Valve 20 can be opened by energization of a solenoid S16a to supply fluid to cylinder 16 to move piston 15 to a position according to FIGS. 1 and 13. When solenoid S16b is energized, valve 20 shifts to connect cylinder 16 to exhaust so piston 15 can be moved away from its left hand position.

Valve 18 is so designed that, when occupying its FIG. 1 position, it permits free discharge of fluid from cylinder 16, which fluid is conveyed through valve 20 to exhaust. The arrangement is such that the holding force of the abutment 14 is higher than the force which can be exerted by the cylinder piston Z in the direction of the arrow 21. Valve 18 is expediently designed as a control valve and is adapted to be opened by spring pressure and may be closed by a stem 22. In this way, valve 18 may be closed in such a manner that the pressure fluid prevailing in cylinder 16 will at a desired point flow off only slowly when solenoid S16b is energized whereby abutment 14 can yield in the direction of the arrow 21 while the drum speed produced by piston 13 will be reduced.

In operation of valve 18, the cam $a$ on disc 9 when shaft 6 reciprocates will lift the stem 22 against the bias of spring $b$ so that head $22'$ thereof will effect choking of the fluid escaping from cylinder 16. When the valve stem 22 has not yet been lifted, spring $b$ presses the stem 22 downwardly, in which instance the flange $c$ rests upon the bottom of the valve housing $d$.

Stand 2 has linked thereto a plurality of circumferentially arranged gripper pairs or grippers 23 and 24 distributed over the circumference of drum 7. This link connection is such that the grippers 23 and 24 can be tilted or moved radially with regard to the drum. The outer grippers 23 on one hand and the inner grippers 24 on the other hand are interconnected by means of elastic annular bands 25 and 26 of rubber or the like, in such a way that a movement of grippers 23 and 24 will bring about a change in the diameter of the bands 25 and 26. Bands 25 and 26 are so designed that due to the tension therein they will always tend to pull the grippers 23 and 24 radially inwardly.

An annular spring or roller element 45 is mounted on the outer tip of band 26.

Adjustable abutments, e.g., adjustable bolts 27, are connected to grippers 23. Grippers 23 and 24 in their turn are connected by small hydraulic cylinders 28 in such a way that the radial distance between the bands 25 and 26 may be varied and thus a movement of the grippers relatively may be effected.

Grippers 23 also have stop lugs 23a which engage stand 2 as grippers 23 move outwardly and thus limit outward movement of the grippers 23. Valve means 28a connected to cylinders 28 is controlled by solenoids S28a and S28b. When solenoid 28a is energized the valve means shifts to supply pressure fluid to cylinders 28 to force the grippers 23 and 24 apart, while energization of solenoids 28b will shift the valve means to exhaust the cylinders.

Axially displaceably mounted on a sleeve 29 forming part of the bearing 4 is a basket or carrier 31 having its ends provided with rollers 30. Basket 31 is adapted to be moved by means of a power cylinder 32. Rollers 30 are in engagement with surfaces 33 of the levers 24. Levers 24 thus rest upon the rollers 30. Rod means 40 has a head that provides a stop for the basket in its extreme left hand position.

Cylinder 32 has a control valve 32a and there is also a choke valve $n$ in series with the cylinder. Energization of solenoid S32R will shift the valve to cause carrier 31 to move to the right but at a controlled rate on account of choke valve $n$. Energization of solenoid S32L will shift the valve to cause carrier 31 to move to the left.

The operation of cylinders 28 can now be understood. The cylinders 28 on the grippers are fixedly connected thereto. Each cylinder 28 has reciprocably mounted therein a piston rod $e$ which is pivotally connected to gripper 24. The movement of the grippers 23 and 24 radially inwardly is effected by the pre-tensioned rubber bands 25 and 26. However, no movement of the members 23 and 24 at random is possible because the surfaces 33 of grippers 24 rest on rollers 30 so the rollers 30 form a firm counter bearing for the surfaces 33. The axial movement of the basket 31 with the rollers 30 thus determines the inward movement of the grippers 23 and 24. On the other hand, it is possible by means of piston rod $e$ to bring about an opening of the grippers. In the position shown in FIG. 1 grippers 24 rest on roller 30, whereas grippers 23 are lifted away from grippers 24 by means of pressure supplied to the cylinder piston systems 28, $e$ via conduit $f$ from valve means 28a.

Due to the movable support of cylinders 28, it is a matter of course that the feeding conduit $f$ has to be flexible and pressure resistant. Hydraulic hose may be used for this purpose.

Between sleeve 29 and supporting shaft 6 there is mounted an axially displaceable tube 34. The front end of tube 34 supports a bearing 35 for the bead cores 36 of the pneumatic vehicle tire to be built. By means of a further cylinder 37, the core placing or folding mechanism comprising the parts 34 and 35 may be moved in the direction toward or away from drum 7.

Valve 37a is connected to cylinder 37 and energization of solenoid S37L will cause movement of the core placing mechanism to the left while energization of solenoid S37R will cause the core placing mechanism to move to the right.

In connection with the gripper means represented by arms 23 and 24, it will be observed that arm 23 carries a stop means 23a which abuts stand 2 when arm means 23a is in the outermost position to which it is to be moved.

It will also be observed that at least one of the arms, 24, has a finger portion 24a thereon adapted for closing a limit switch LS1 when the arm means 24 moves outwardly into fabric gripping relation with arm means 23. This limit switch interlocks the operation of the various parts of the machine.

Figure 13:
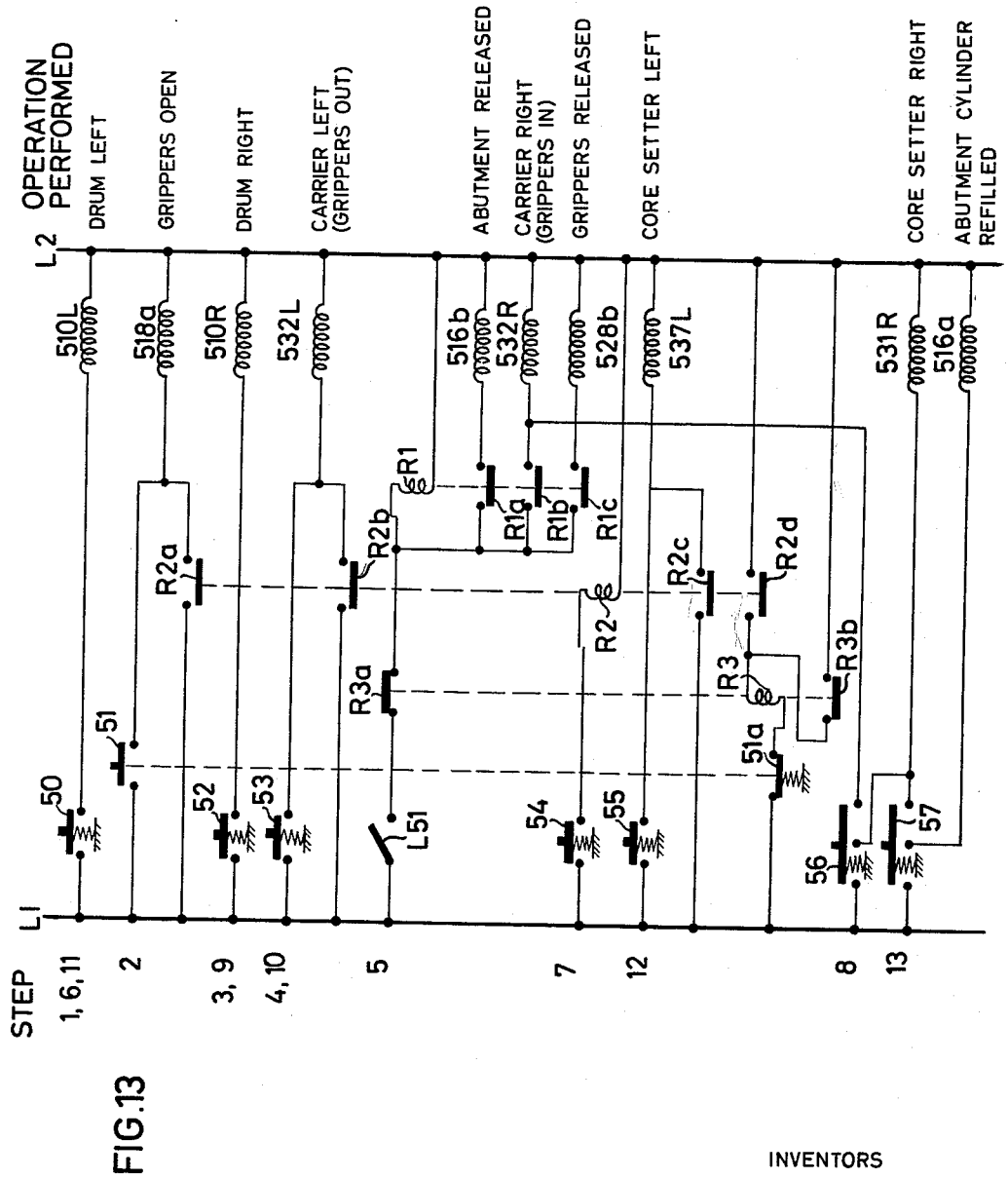
FIGURE 13 is a diagrammatic representation of the control circuit for controlling the machine.

The electric control system for actuating the several solenoid operated valves illustrated in FIGURE 1 hydraulically associated with the various motors therein is illustrated in FIGURE 13.

In FIGURE 13 the supply means are indicated at L1 and L2. Between these supply means are connected the various valve actuating solenoids above referred to. These solenoids are all pull type solenoids and when energized pulls the pertaining valve member of the pertaining valve toward the energized solenoid.

In addition to the valve solenoids there is connected between the mains L1 and L2 the coils of relays R1, R2 and R3 which are employed for interlocking the successive operations of the machine.

Solenoid S10L is in series with a normally open push button station 50, which, when closed, will bring about energization of solenoid S10L and shifting of the valve associated therewith and causes movement of shaft 6 and the parts connected thereto to the left.

Solenoid S28A is connected in series with one normally open blade of a second push button station 51, which has a second blade that is normally closed at 51a in series with the coil of relay R3, and which in turn is also in series with a normally open blade R2d forming a part of relay R2.

Closing of switch 51 will energize valve solenoids 28a and bring about opening of the grippers. The normally open blade of switch 51 is also by-passed by a normally open blade R2a of relay R2.

Solenoid S10R which, when energized, will cause movement to the right of shaft 6 and the parts connected thereto, is in series with a normally open push button 52. Valve solenoid S32L, which, when energized, causes movement of the carrier 37 to the left, is in series with a normally open push button station 53 and is by-passed by a normally open blade R2b of relay R2.

The coil of relay R1 is connected between mains L1 and L2 in series with the aforementioned limit switch LS1 that is controlled by one of gripper arms 24 and a normally closed blade R3a of relay R3.

When relay R1 closes, it closes a blade R1a that is in series with valve solenoid S16b pertaining to the control valve that releases fluid in cylinder 16 that will permit shaft 6 to yield towards the right.

A second blade R1b of relay R1 is in series with valve solenoid S32R, which, when energized, will bring about rightward movement of carrier 31.

A third blade R1c closes upon energization of relay R1 and completes a circuit to valve solenoid S28b, which releases fluid from the cylinder 28 pertaining to the grippers.

The coil of relay R2 is in series with a normally open push button 54 and this button is arranged to effect momentary energization only of R2 in order to close its blades R2a, R2b, R2c and R2d. Blade R2c is in series with valve solenoid S31L, which, when energized, causes the core setter 35 to move to the left. This valve solenoid is also in circuit with another normally open push button 55 for manual control of the core setter.

Relay R3, which is energized by the closing of R2d of relay R2, has a holding circuit including blade R3b, so that upon energization of relay R3 it will remain energized until blade 51a of push button 51 is opened.

Still another push button 56 has one terminal connected to valve solenoid S32R for energization thereof upon closing of switch 56, and another terminal connected to valve solenoid S37R, which, when energized by closing of switch 56, causes core setter 35 to move to the right.

A final push button station at 57 has one terminal connected with valve solenoid S37R, referred to immediately above, and another terminal connected to the valve solenoid S16b, which, when energized, by closing of switch 57, will bring about filling of cylinder 16 preparatory for a new cycle of the machine.

In operation the drum 7 is moved to its extreme left hand position. This can be done by closing switch 50. The fabric layers 38 are then placed on the drum. At this time the carrier 31 is in its extreme right hand position, so that rollers 30 are retracted to the right, thus leaving the gripper arms 23 and 24 in an inner position. At this time switch 51 is closed, which will energize valve solenoid S28A and energize motors 28 to pull gripper arms 23 upwardly, thereby to open the grippers.

Actuation of switch 51 also effects de-energization of relay R3 which had been energized in a previous cycle.

Switch 52 is now closed and this will move drum 7 to the right to its FIGURE 1 position, where it stops on account of disk 9 striking the abutment represented by piston 14.

It will be appreciated that motor 10 remains energized and continuously biasing shaft 6 and drum 7 toward the right, but no movement can take place beyond the FIGURE 1 position thereof because fluid is entrapped in cylinder 16. The last mentioned movement of drum 7 carries the marginal portion 38' of fabric 38 in between gripper elements 25 and 26, and fabric can now be gripped between the grippers.

The gripping of the fabric is accomplished by closing switch 53, which energizes valve solenoid S32L and causes carrier 31 to move to the left, so that rollers 30 ride on cam portions 33 of arms 24 and push these arms outwardly toward arms 23. Arms 23 at this time are stopped by stops 23a associated therewith and fluid that is entrapped in the upper end of cylinder 28a may at this time be exhausted through relief valve 58 connected to the cylinder, should this be necessary. The grippers are shown in this position in FIG. 2.

When arms 24 move outwardly into gripping position switch Ls1 is actuated and this brings about energization of relay R1 to close the blades thereof. These blades close and energize valve solenoids S16b, S32R and S28b.

Energization of solenoid S16b shifts the control valve for cylinder 16 so that fluid commences to be forced therefrom, and the abutment, which has been holding shaft 6 and drum 7 stationary, commences to yield to the right and the drum moves towards the grippers.

Energization of solenoid S32R shifts the control valve pertaining to cylinder 32, and the piston of this cylinder also commences to move toward the right, moving carrier 31 rightwardly. The rate at which this movement takes place may be controlled by the setting of valve N, although the particular rate of movement of carrier 31 is not considered to be critical.

Energization of solenoid S28b shifts the valve pertaining to motors 28 and this completely exhausts fluid from the motors 28, so that the grippers are now free to move in unison, as determined by the tension in the bands 25 and 26 that form the gripper elements proper.

Figure 3:
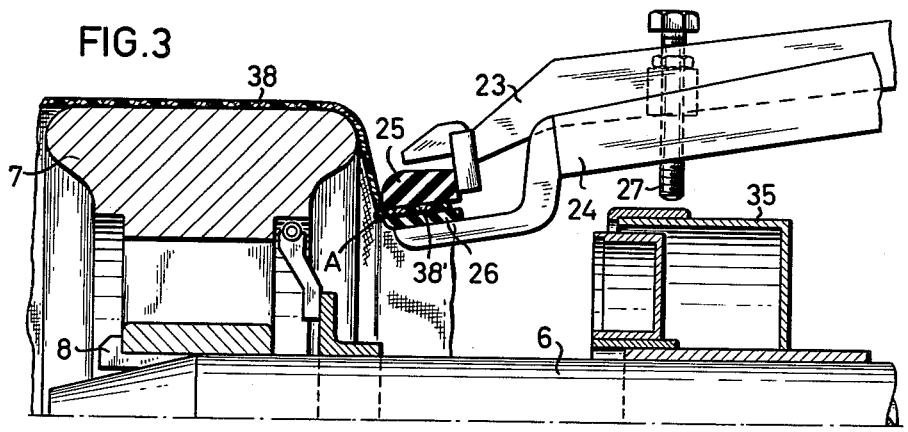
Figure 4:
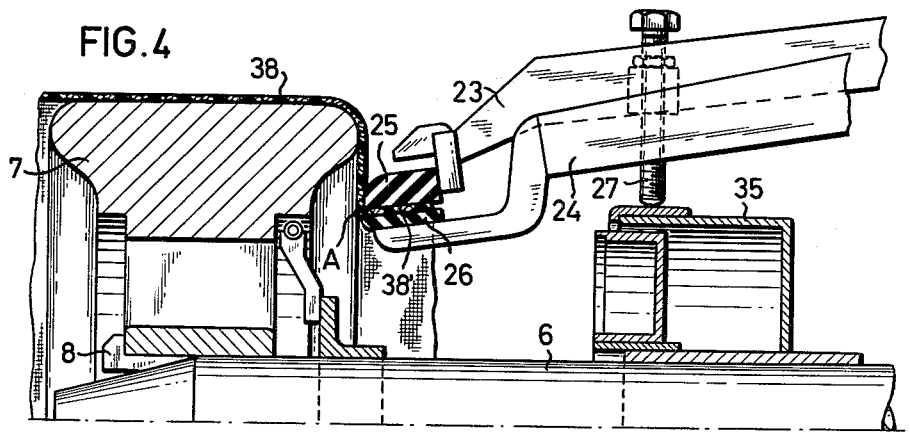

The movement of the drum rightwardly toward the grippers is accompanied by inward movement of the grippers toward the axis of the drum and according to the fabric extending between the drum and the grippers. The effect is to wrap the fabric around the end of the drum. The action that is taking place during this movement is illustrated in FIGURES 3 and 4.

Figure 6:
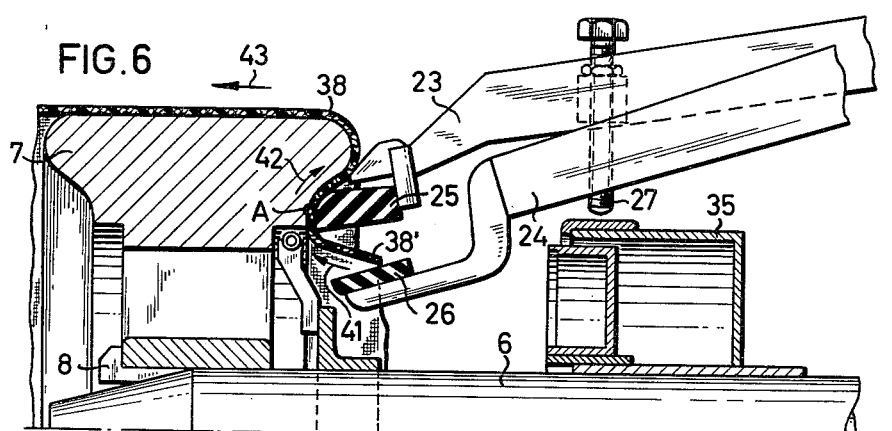
Figure 7:
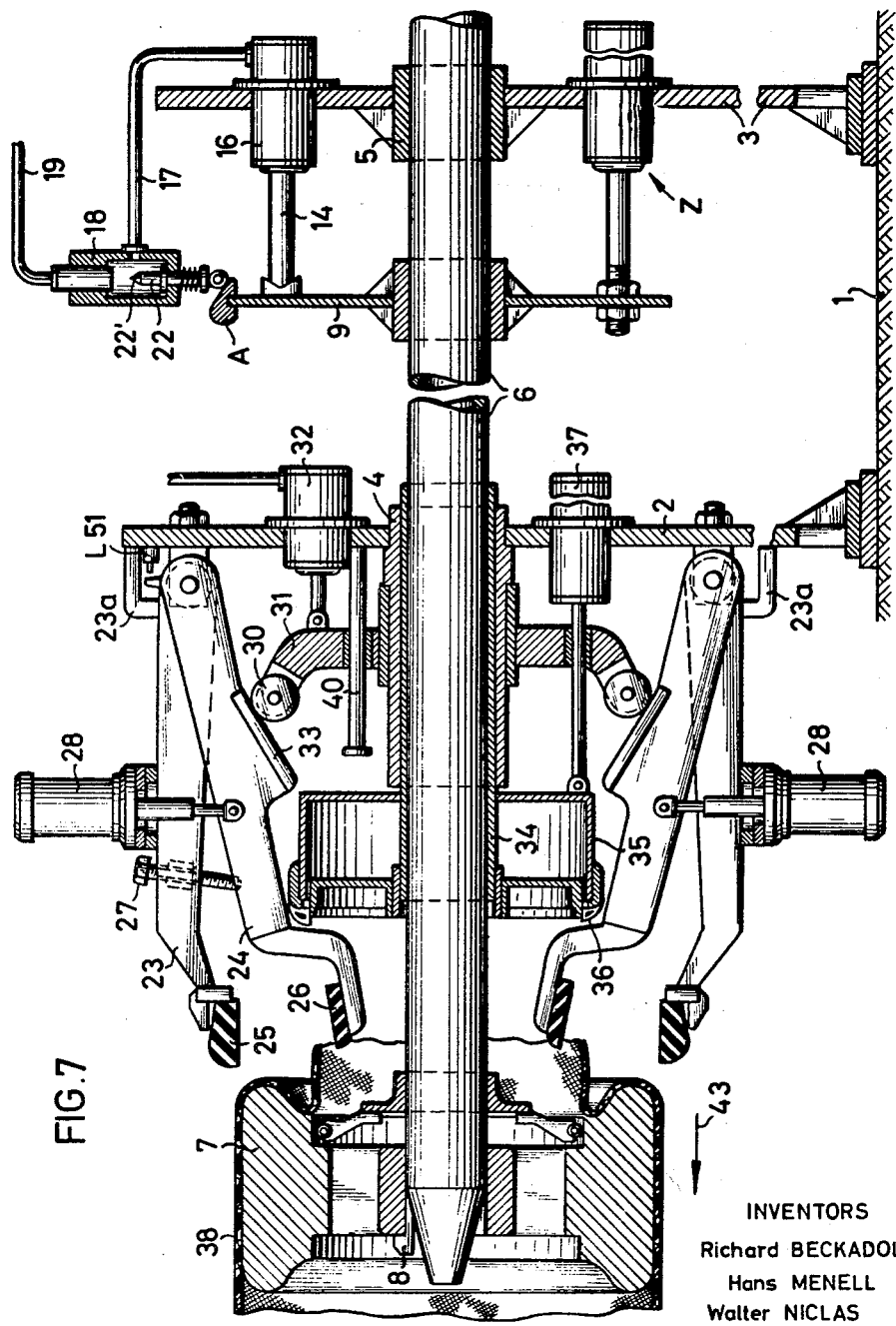

Inward movement of the grippers continues accompanied by rightward movement of the drum until stop screws 27 pertaining to arms 23 engage the abutment ring provided therefor on core setter 35. At this time the gripper arms 23 halt, while gripper arms 24 can continue to move. This permits slipping of the marginal portion of the fabric between the grippers, so that during continued movement of the drum the fabric is laid on the side of the drum smoothly, and without the necessity of effecting any complicated cam control of the gripper elements, as has been the case with prior art patents. The final movement of the drum and grippers will be seen in FIGURES 5 and 6.

During the aforementioned rightward movement of the drum a control of the speed thereof is effected by the cam means A carried by disk 9, which engages stem 22 of valve 18 and effects adjustment thereof, thereby to throttle the discharge of fluid from cylinder 16. In this manner the rate of movement of the drum can be controlled over its entire movement or over any part thereof, and, particularly, during the critical period when the fabric is being laid about the drum in a wrinkle-free manner and the grippers are approaching the position where they will commence to release their grip on the fabric and permit the fabric to slip therebetween.

Switch 50 is again closed and drum 7 is again moved to its lefthand position. Switch 54 is then closed and energizes relay R2, which effects opening of the grippers by closing of blades R2a and R2b to energize valve solenoids S28A and S32L.

Closing of relay R2 closes blade R2c thereof to cause leftward movement of core setter 35 and also closes blade R2d to effect energization of interlock relay R3, which closes its holding blade R3b, while simultaneously opening the interlock blade R3a, which prevents energization of relay R1 which would come about by the aforementioned opening of the grippers unless the described interlock was provided.

Leftward movement of the core setter brings the machine into the position illustrated in FIGURE 8 which sets annular head core element 36 against the side of the drum. The device indicated at 44 on shaft 6 may be manually operated in order to iron the marginal portion of the fabric inwardly into the inside of the core setter as indicated at 38'. Alternatively, the core setter may push drum 7 along shaft 6 and by fixing device 44 to the shaft the ironing of the fabric into the core setter can be accomplished by power. The drum, of course, is put back in position on shaft 6 after the core setter is retracted.

Figure 9:
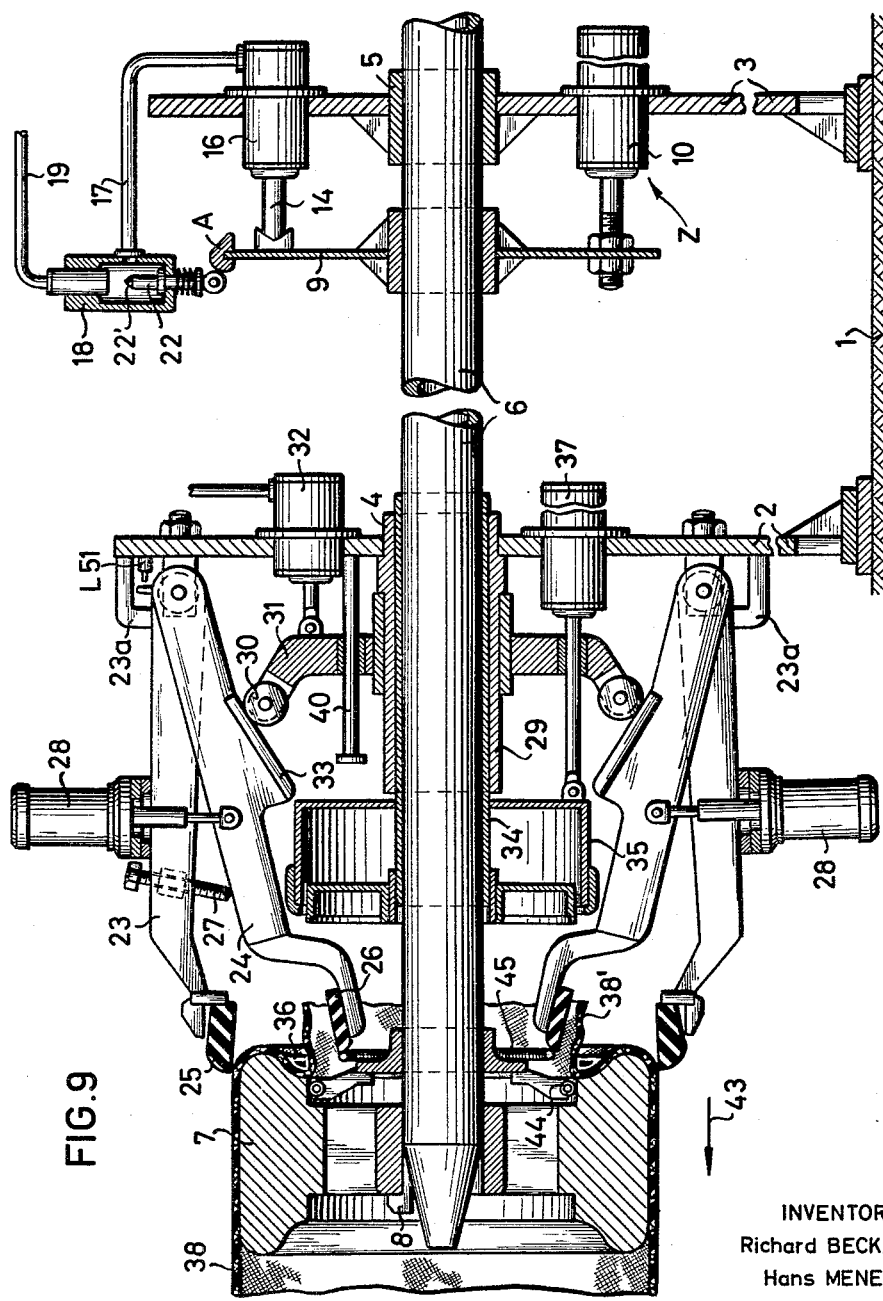

The switch 56 is now closed and this will effect energization of solenoid S37R to cause rightward movement of the core setter, while simultaneously valve solenoid S32R is energized, which causes carrier 31 to move to the right, thereby allowing gripper arms 24 to swing inwardly to their extreme inner portions. Switch 52 is now closed to energize valve solenoid S10R, which causes drum 7 to move to the right to its FIGURE 9 position. It will be observed that this disposes the marginal portion 38' of the fabric outside gripper element 26.

Figure 10:
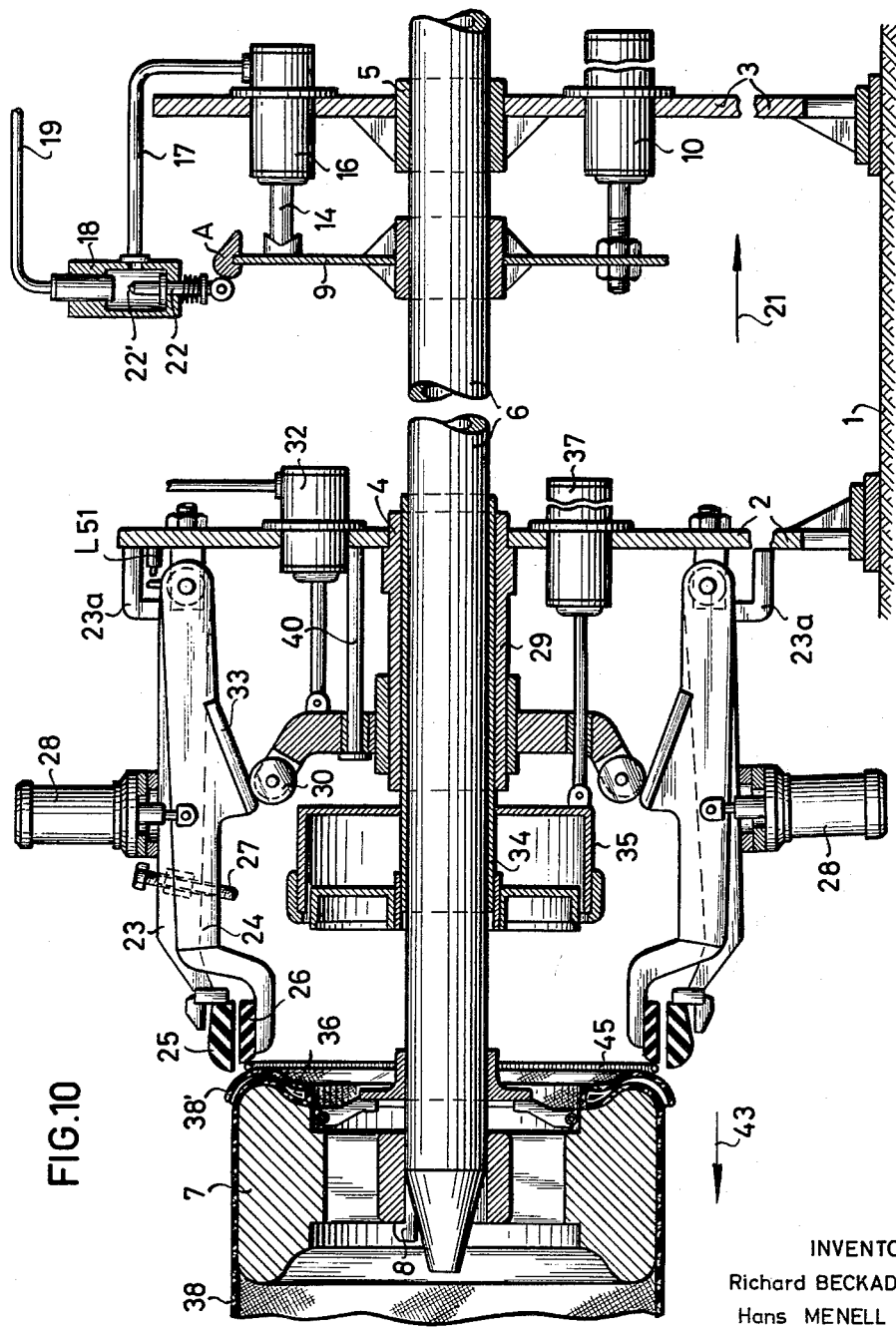
Figure 11:
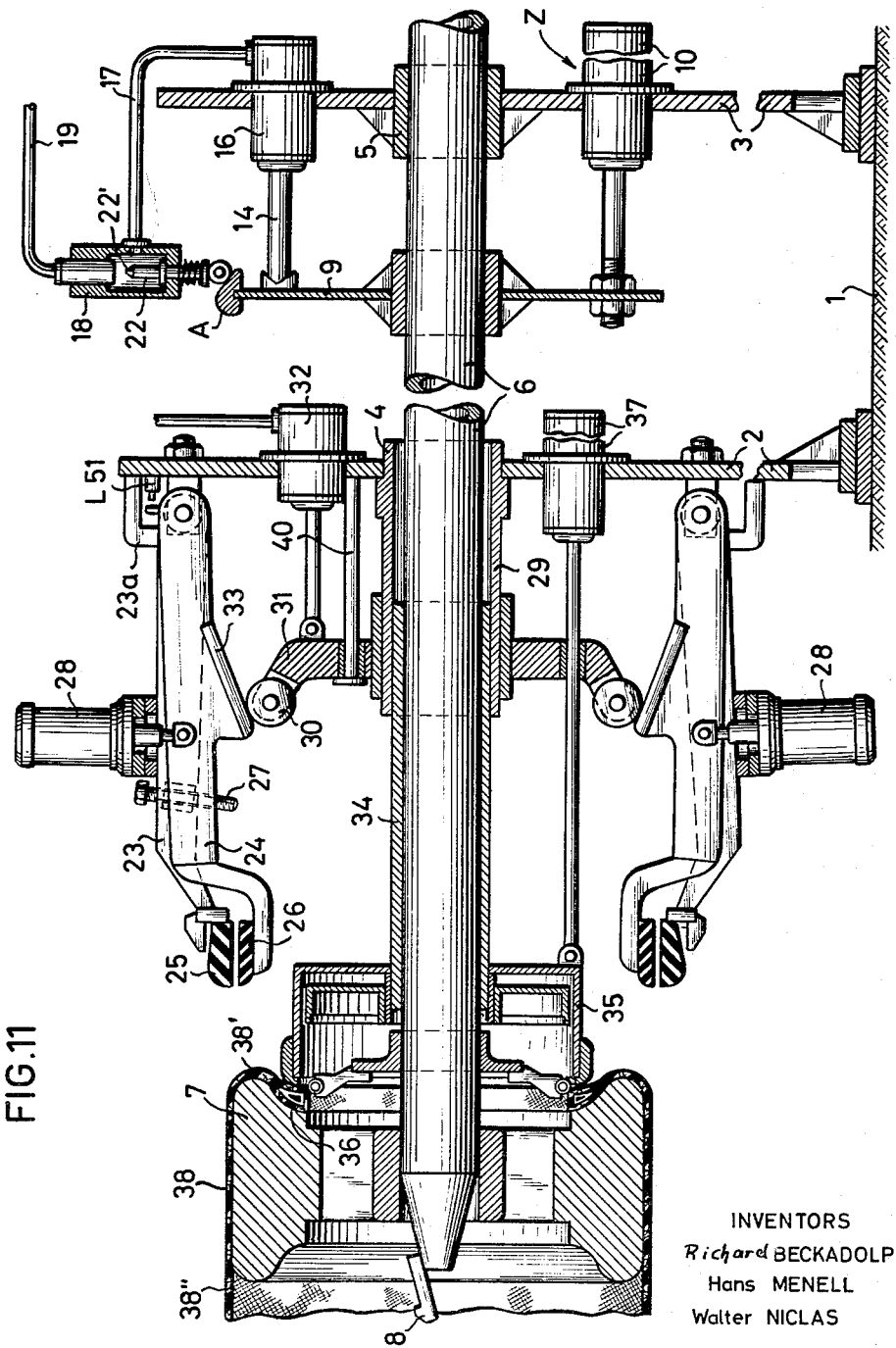

Switch 53 is now closed to energize valve solenoid S32L and this will cause carrier 31 to move to the left, thereby to swing inner gripper arms 24 outwardly. During this outward movement the annular spring means 45 carried at the outer tip of gripper element 26 will iron the marginal portion 38' of the fabric outwardly and around the bead core 36 that was put in place by the bead setter 35. This action is illustrated in FIGURE 10.

The switch 50 is now again actuated to energize valve solenoid S10L to cause the drum to move to the left. Switch 55 is now closed and this causes movement of the core setter leftwardly and the core setter will engage the drum and push it axially on shaft 6, key 8 at this time being pulled, thereby to release the drum from the shaft, so that it can be taken off the shaft and turned around. At this time key 8 is removed so that the drum can be manipulated. The drum is turned around and replaced on the shaft with the other marginal edge of the fabric projecting inwardly toward the gripper means, as indicated at 38" in FIGURE 12, preparatory to carrying out a new cycle.

Prior to the carrying out of the new cycle, switch 57 is closed, which will return the core setter to the right, and which will also cause refilling of the abutment cylinder. At this time a new cycle of operation can be commenced, except at this time the cycle can be initiated by closing switch 51, since the drum is already in its left hand position and the switch 50 need not be operated.

It will be evident that the several switches referred to above, by means of which the operation of the machine is controlled, could be actuated by timer means and thereby provide for a completely automatic cycle of operation that could be initiated after the fabric was applied to the drum by closing a start switch. Such automatic operation could be interlocked with limit switch means such as are provided for detecting when the inner gripper arms reach their outermost position. In this manner, an entirely automatic cycle could be carried out for applying the fabric to each side of the drum.

It will also be apparent from the foregoing description that the method and apparatus of the present invention entirely eliminates complex cam arrangements for controlling the movement of the grippers. While, at the same time, the fabric is applied in a smooth and wrinkle free manner to the drum thereby leading to a high quality tire carcass.

It will be understood that this invention is susceptible to modification in order to adapt it to different usages and conditions; and, accordingly, it is desired to comprehend such modifications within this invention as may fall within the scope of the appended claims.

We claim:

1. A method of making tire carcasses on a drum which comprises; applying fabric to the drum with the marginal portion of the fabric extending axially from the periphery of the drum, gripping the said marginal portion of the fabric by gripper means and in a region spaced from the drum, moving the drum in a direction toward the gripped region of the fabric while simultaneously moving the gripper means to carry the gripped region of the fabric toward the axis of the drum, and causing the fabric to slip in the gripper means during continued movement of the drum and the gripper means.

2. A method of making tire carcasses on a drum which comprises; applying fabric to the drum with the marginal portion of the fabric extending axially from the periphery of the drum, tightly gripping the marginal portion of the fabric in a region spaced axially from the drum, moving the drum axially toward said gripped region of the fabric while simultaneously moving said gripped region of the fabric toward the axis of the drum, decreasing the gripping force on said gripped region of the fabric at a predetermined inwardly moved position of said gripped region so the gripped region will slip on the fabric toward the margin thereof, and effecting said reduction of the gripping force during continued movement of the drum.

3. A method of making tire carcasses on a drum which comprises; applying fabric to the drum with the marginal portion of the fabric extending axially from the periphery of the drum, tightly gripping the marginal portion of a fabric in a region spaced axially from the drum, moving the drum axially toward said gripped region of the fabric while simultaneously moving said gripped region of the fabric toward the axis of the drum, controlling the rate of movement of said drum during its said axial movement, decreasing the gripping force on said gripped region of the fabric at a predetermined inwardly moved position of said gripped region so the gripped region will slip on the fabric toward the margin thereof, and effecting said reduction of the gripping force during continued movement of the drum.

4. A method of making tire carcasses on a drum which comprises; applying fabric to the drum with the marginal portion of the fabric extending axially from the periphery of the drum, tightly gripping the marginal portion of a fabric in a region spaced axially from the drum, moving the drum axially toward said gripped region of the fabric while simultaneously moving said gripped region of the fabric toward the axis of the drum, controlling the rate of movement of said drum during its said axial movement, controlling the rate of inward movement of said gripped region of the fabric during said axial movement of the drum, decreasing the gripping force on said gripped region of the fabric at a predetermined inwardly moved position of said gripped region so the gripped region will slip on the fabric toward the margin thereof, and effecting said reduction of the gripping force during continued movement of the drum.

5. A method of forming fabric about a tire building drum by fabric grippers to form a tire carcass which comprises; winding fabric on the drum with the marginal portion of the fabric extending axially from the periphery of the drum and disposed between inner and outer gripper elements, closing the gripper elements to grip the fabric tightly in a region spaced axially from the drum, moving the drum axially toward said gripped region of the fabric while simultaneously moving the gripper elements as a unit toward the axis of the drum, and interrupting the inward movement of the outer gripper element at a predetermined inwardly moved position thereof while continuing the inward movement of the inner gripper element and the axial movement of the drum whereby the fabric slips in the gripper elements.

6. A method according to claim 5 in which the said movement of the drum is continued until it reaches a position adjacent said outer gripper element whereby the fabric is smoothly applied to the side of the drum.

7. A method of forming fabric about a tire building drum by fabric grippers to form a tire carcass which comprises; winding fabric on the drum with the marginal portion of the fabric extending axially from the periphery of the drum and disposed between inner and outer gripper elements, closing the gripper elements to grip the fabric tightly in a region spaced axially from the drum, moving the drum axially toward said gripped region of the fabric while simultaneously moving the gripper elements as a unit toward the axis of the drum, controlling the rate of movement of the drum during its said axial movement, interrupting the inward movement of the outer gripper element at a predetermined inwardly moved position thereof while continuing the inward movement of the inner gripper element and the axial movement of the drum whereby the fabric slips in the gripper elements.

8. A method of forming a fabric sleeve on a tire drum about the side portions of the drum which comprises the steps of: placing the fabric sleeve on the tire drum so the marginal portion of the fabric extends beyond the end face of the drum; gripping said extending margin portion of the fabric sleeve in a slip free manner, and in a region spaced axially from the drum moving the gripped marginal portion of the fabric sleeve in the direction toward the axis of the drum and toward the adjacent side portion of the drum while holding the fabric between the drum and the gripped region under tension; and after a predetermined inward movement of the gripped marginal portion of the fabric changing in a continuous movement the area in which the fabric is gripped toward the margin thereof while maintaining tension on the fabric throughout the forming thereof about the side portion of the drum.

9. A method according to claim 8 which includes the steps of moving the drum toward the gripped region of the fabric sleeve continuously and at a controlled rate during the forming of the fabric sleeve about the side portion of the drum.

10. A method for forming a fabric sleeve on a tire drum about the side portions of the drum which comprises the steps of: placing the fabric sleeve on the tire drum so the marginal portions of the fabric extends beyond the opposite end faces of the drum; gripping said extending margin portion of the fabric sleeve on one side of the drum in a slip-free manner and in a region spaced axially from the drum; moving the gripped marginal portion of the fabric sleeve in the direction toward the axis of the drum, and toward the adjacent side portion of the drum while holding the fabric between the drum and the gripped region under tension; after a predetermined inward movement of the gripped marginal portion of the fabric changing in a continuous movement the area in which the fabric is gripped toward the margin thereof while maintaining tension on the fabric throughout the forming thereof about the said adjacent side portion of the drum, turning the drum around, and repeating the foregoing steps to form the other end of the fabric sleeve about the side portion of the drum adjacent thereto.

11. A method according to claim 10 which includes the steps of moving the drum toward the gripped region of the fabric sleeve continuously and at a controlled rate during the forming of each end of the fabric sleeve about the adjacent side portion of the drum.

References Cited by the Examiner
UNITED STATES PATENTS

| | | | |
|---|---|---|---|
| 2,488,863 | 11/49 | Haase | 156—402 |
| 2,904,099 | 9/59 | Niclas | 156—394 |
| 3,081,814 | 3/63 | Beckadolph et al. | 156—394 |

FOREIGN PATENTS 777,130  6/57  Great Britain.

EARL M. BREGET, *Primary Examiner.*